United States Patent [19]

Murata et al.

[11] 4,175,231
[45] Nov. 20, 1979

[54] DEVICE FOR DETECTING A MOVING BODY

[75] Inventors: Shinji Murata, Tokyo; Toshio Iwaya, Machida, both of Japan

[73] Assignee: Canon Kabushiki Kaisha, Tokyo, Japan

[21] Appl. No.: 833,707

[22] Filed: Sep. 15, 1977

[30] Foreign Application Priority Data

Sep. 28, 1976 [JP] Japan .................... 51-116258
Aug. 22, 1977 [JP] Japan .................... 52-100300

[51] Int. Cl.² ............................... G02B 5/14
[52] U.S. Cl. ............................... 250/227
[58] Field of Search ............ 250/227, 216, 211 R, 250/211 J; 350/1.4, 190, 198, 188

[56] References Cited
U.S. PATENT DOCUMENTS

| | | | |
|---|---|---|---|
| 2,275,602 | 3/1942 | Beck et al. | 350/188 |
| 2,883,649 | 4/1959 | King, Jr. | 250/227 |
| 3,581,099 | 5/1971 | Franke | 350/198 |

*Primary Examiner*—David C. Nelms
*Attorney, Agent, or Firm*—Fitzpatrick, Cella, Harper & Scinto

[57] ABSTRACT

A photoguide member having a first end face opposed to the path followed by a moving body and a second end face through which the light having entered through said first end face exits is disposed along the path of the moving body. The photoguide member is formed of a light transmitting material and has a recess formed in the second end face thereof. Light projected on the moving body enters the photoguide member through its first end face and passes through the photoguide member, whereafter the light travels to photodetector disposed in opposed relationship with the recess in the second end face. The body is detected in accordance with the presence of the light passing to the photodetector. The gap between the photoreception surface of the photodetector and the recess may be filled with a light transmitting material.

12 Claims, 16 Drawing Figures

1

DEVICE FOR DETECTING A MOVING BODY

BACKGROUND OF THE INVENTION

1. Field of the Invention

This invention relates to a device for detecting a body such as a moving original or copy paper.

2. Description of the Prior Art

In the rotary press type cameras, copying machines, printing machines, etc., a body such as an original or a sheet of copy paper is moved and by detecting the moving body, a film or photosensitive medium for recording the body is moved or operative timing of various recording means is controlled.

The detecting device of this type has heretofore comprised a light source and a photoreception element opposedly disposed with the path of the body interposed therebetween so that interception of the light from the source by the body moving between the light source and the photoreception element is detected in accordance with a variation in quantity of light received by the photoreception element. According to such method, however, the photoreception element can not efficiently receive the light from the source and this has resulted in a low detection sensitivity and a narrow range of detection for the body, which in turn has led to unreliable detection of the body. There has been another disadvantage that the detection time is delayed when the leading end edge of a rectangular body such as a sheet of paper is inclined with respect to the direction of its movement, namely, when such a body is moving obliquely.

A wide detection range could be attained by providing a multiplicity of light sources and photoreception elements, whereas this would lead to complication and expensiveness of the device. As an alternative method, a pair of reflecting plates has been provided between a light source and a photoreception element so that light from the source has been repetitively reflected between the pair of reflecting plates to thereby cause the reflected light passing across the path of the body to be received by the photoreception element. However, this has offered difficulties in aligning the optic axes of the light source and the photoreception element, which has also led to a disadvantage that much skill is required in assembly of the device.

SUMMARY OF THE INVENTION

It is an object of the present invention to provide a detecting device which has a relatively wide detection range and is capable of detecting a moving body reliably and in a short time.

It is another object of the present invention to provide a detecting device which permits easy alignment of optic axes and which may be easily assembled and fabricated.

The invention will become more fully apparent from the following detailed description thereof taken in conjunction with the accompanying drawings.

DESCRIPTION OF THE PREFERRED EMBODIMENTS

Figure 1:
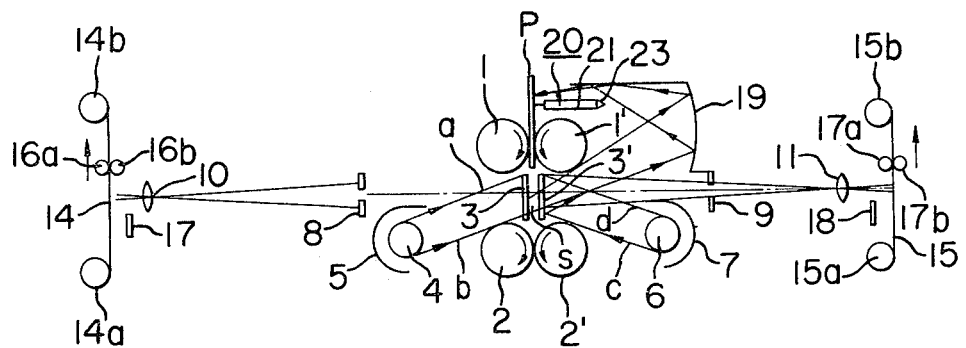
FIG. 1 shows the general construction of a rotary press type microfilm camera to which the present invention is applied.

FIG. 1 shows a rotary press type microfilm camera to which the present invention is applied. A sheet-like object P to be photographed such as a check or a stock-certificate is fed to a photographing station S by a pair of inlet rollers 1 and 1' and discharged from the photographing station S by outlet rollers 2 and 2'. The inlet 1, 1' and the outlet rollers 2, 2' are coupled to a drive motor (not shown) to move the object P at a predetermined velocity during the photography of the object. The gap between the inlet rollers 1, 1' and the outlet rollers 2, 2' is shorter than the length of the object P in its direction of movement. Disposed at the gap is a pair of transparent glass plates 3 and 3' with the photographing station S interposed therebetween. The pair of glass plates 3 and 3' are spaced apart from each other and parallel to the path of the object passing through the photographing station, and serves to hold the object at the focus position during the photography. As the object P passes through the photographing station S between the glass plates 3 and 3', both the front and back surfaces of the object are illuminated by light sources 4 and 6, respectively. Disposed behind the light sources 4 and 6 are reflectors 5 and 7, respectively. Lines a, b, c and d represent the light beams from the sources 4 and 6.

The images on both sides of the object P are optically passed through slits 8 and 9 and photographed through picture-taking lenses 10 and 11 onto moving microfilms 14 and 15.

The microfilms 14 and 15 are stretched from respective supply reels 14a and 15a to respective take-up reels 14b and 15b, and fed in the direction of arrows by respective capstan rollers 16a, 17a and respective pinch rollers 16b and 17b.

The supply reels 14a, 15a and the take-up reels 14b, 15b are coupled to tensioning drive motors and driven thereby so as to pull on the films 14 and 15 in opposite directions to each other in order to impart predetermined tensions to these films. The capstan rollers 16a and 17a are coupled to film driving motors (not shown) so that they are driven to feed the films at a velocity equal to the velocity of movement of the object images on the films when the object P has been detected by an object detecting means which will hereinafter be described. Thus, the films 14 and 15 are fed in synchronism with the object P and the images on both sides of the object are projected through the slits onto the films 14 and 15. Designated by 17 and 18 are shutters for opening and closing the picture-taking light paths.

Denoted by 19 is a mirror for receiving light beams from the sources 4 and 6. The light beam having impinged on the mirror 19 is reflected immediately before the inlet rollers 1 and 1' and toward the object P passing along its path, so that the reflected light beam from the object P is detected by an object detecting device 20. Upon detection of the object, the detecting means 20 generates a signal for driving the capstan rollers 16a and 17a and for driving the shutters 17 and 18.

Figure 2:
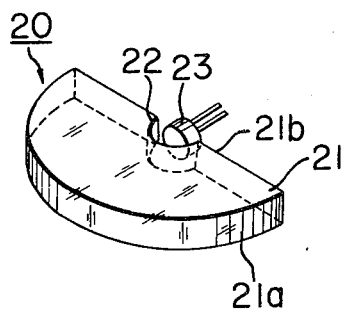
FIG. 2 is a perspective view of the detecting device shown in FIG. 1.
Figure 3:
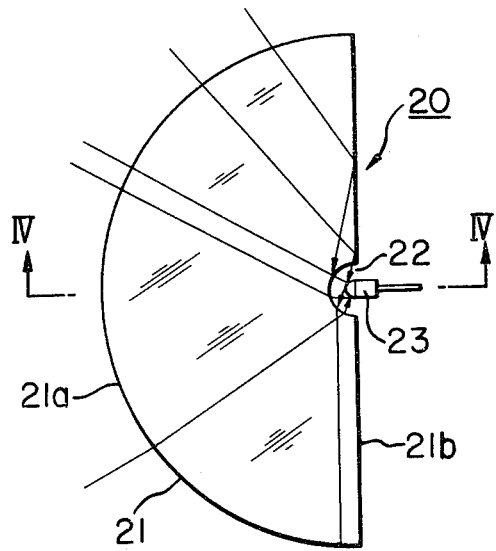
FIG. 3 is a top plan view of the detecting device.
Figure 4:
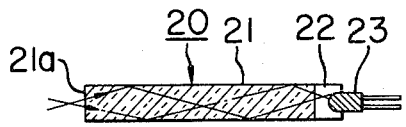
FIG. 4 is a cross-sectional view taken along line IV—IV in FIG. 3.

As shown in FIGS. 2 to 4, the object detecting device 20 includes a photoguide member 21 having a first end face 21a opposed to the object's path and a second end face 21b from which the beam having entered through the first end face 21a may exit. The photoguide member 21 has substantially parallel top and bottom surfaces and the first end face 21a thereof has its lateral width extending orthogonal to the direction of movement of the object and generally takes a semicircular arc shape. The photoguide member 21 is formed of a light transmitting material. In the present embodiment, the photoguide member 21 is provided by a transparent glass block comprising a generally semicircular, flat plate having a thickness of 5 mm and a lateral width (diameter) of 60 mm.

The material forming the photoguide member 21 may be synthetic resin such as acrylic resin, polyamide (nylon) or the like.

A semicircularly cut-away recess 22 is formed substantially centrally in the second end face 21b of the photoguide member 21, and a photoreception element 23 such as photocell or the like is disposed in opposed relationship with the recess 22. The photoreception surface of the element 23 is located in the recess 22 so that the element 23 detects the light passed through the photoguide member and exiting from the concave surface of the recess 22.

In the above-described detecting device, when the object P is fed to the position whereat it is opposed to the first end face 21a of the photoguide member 21 (i.e. the detecting position whereat the object P is illuminated by the light from the reflector 19), the light reflected by the front surface of the object passes into the photoguide member 21 through the first end face 21a thereof and is totally reflected within and passed through the guide member, as shown in FIGS. 3 and 4, and then directed to the recess 22 of the second end face for detection by the photoreception element 23. Part of the light having entered through the first end face 21a does not travel toward the photoreception element 23 but exits from the photoguide member and yet, a wide range of incident light may be effectively collected in the recess 22 because the first end face is arcuately curved and the recess is formed in the second end face. Thus, the presence of the object is detected in accordance with the presence of the light impinging on the photoreception element.

The photoguide member 21 may be formed into such a shape that the light having entered through the end face 21a is totally reflected by the internal surface and if required. light reflecting coating may be formed on the top and bottom surfaces. Further, the concave surface of the recess 22 may be formed as a light diffusing surface.

Figure 13:
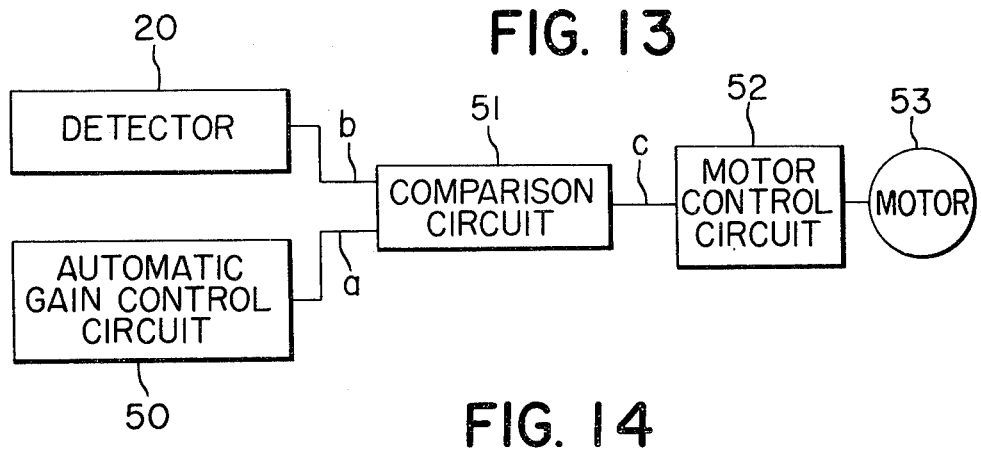
FIG. 13 is a block diagram of the film drive control circuit.

FIG. 13 shows the film drive control circuit in the described camera. It includes an automatic gain control circuit 50, a comparison circuit 51 connected both to the detecting device 20 and the gain control circuit 50, a motor control circuit 52, and a film driving motor 53 coupled to the capstan rollers 16a and 17a.

Figure 14:
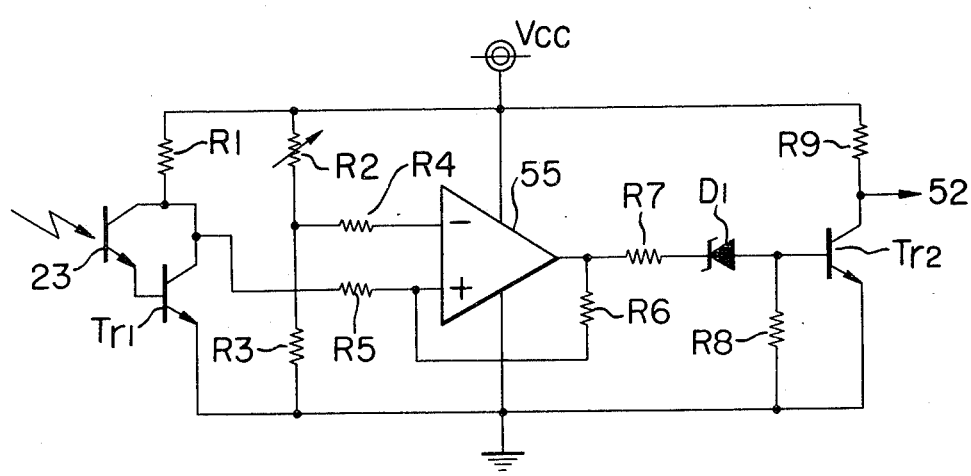
FIG. 14 is a circuit diagram showing an embodiment of the control circuit.

A specific example of the above-described circuit is illustrated in FIG. 14, wherein a phototransistor is employed as the photoreception element 23 of the detecting device 20. There are further seen transistors $Tr_1$, $Tr_2$, an operational amplifier 55, resistors R1, R2, . . . , R9, and a Zener diode D.

Figure 15A:
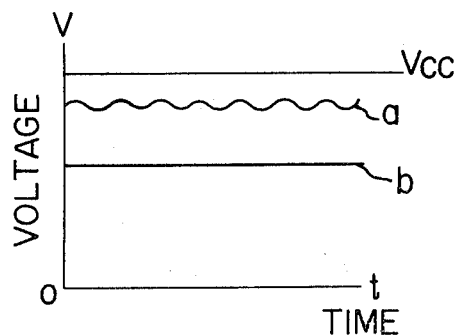
FIGS. 15A and 15B illustrate input waveforms of the comparison circuit.
Figure 15B:
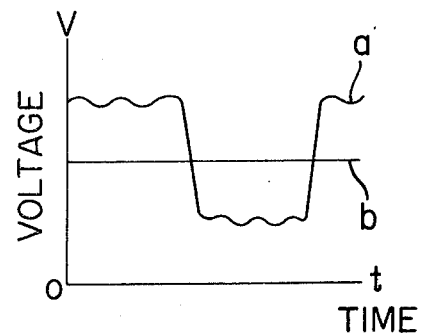

FIG. 15 graphically illustrates the voltage waveforms at the input terminals a and b of the comparison circuit 51, the ordinate and abscissa representing the voltage and the time, respectively. FIG. 15A shows the waveform when the object has been detected, and FIG. 15B shows the waveform when the object has not been detected. Curve a represents the voltage waveform at the input terminal a, and curve b represents the voltage waveform at the input terminal b.

During the non-detecting condition, unnecessary incident light resulting from the disturbing light (noise) around the detecting device enters the detecting device 23 and this disturbing light causes the input terminal a of the comparison circuit 51 to assume the voltage waveform as shown in FIG. 15(A). When there is no such disturbing light entering the photoreception element 23, the voltage level at the input terminal a is equal to the source voltage Vcc.

In accordance with such voltage at the input terminal a, the automatic gain control circuit 50 is controlled to set the voltage at the input terminal b to a predetermined level.

When the object P comes to the detecting position, the reflected light from the object is detected by the photoreception element 23 and the voltage level at the input terminal a of the comparison circuit 50 becomes lower than the voltage level of the input terminal b, as shown in FIG. 15(B). As the result, the output signal from the operational amplifier 55 is inverted and a detection output is put out from the output terminal c of the comparison circuit 51. By this detection signal, the motor 53 is driven through the motor control circuit 52 to feed the films 14, 15, and a suitable timing shutter 17 is also actuated by this detection signal.

Figure 5:
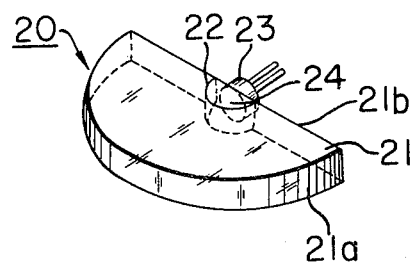
FIG. 5 is a perspective view showing another embodiment of the detecting device.

FIG. 5 shows another embodiment of the present invention. In FIG. 5, the elements functionally similar to those in the previous embodiment are given similar reference characters.

In FIG. 5, the gap between the photoreception surface of the photoreception elements 23 and the recess 22 is filled with a bulking agent 24.

The bulking agent 24 comprises a light-transmitting material such as epoxy resin binder, acrylic resin binder or silicone resin binder, and may preferably be a material having a refractive index approximate or equal to that of the photoguide member 21.

Alternatively, the bulking agent may be either a material having light diffusing property or such material mixed with a light-transmitting material. Where the bulking agent has light diffusing property, the light having entered the filled recess is diffused, whereby the sensitivity distribution of the detection range may be made uniform.

As the light diffusing material, use may be made of five particles of aluminum or zinc oxide or a mixture of at least two synthetic resin materials having difference refractive indices.

Further, the bulking agent may also consist of a material selectively transmitting therethrough a predetermined specific range of wavelength, for example, a material transmitting therethrough only infrared rays and in this case, the object may be detected by being illuminated by a source of infrared rays, whereby any erroneous detection which would otherwise occur due to incidence on the photoreception element of disturbing light except the infrared rays may be prevented, thus enhancing the reliability of the detecting device.

In the apparatus of FIG. 1, a sheet of paper having a reflection factor of 20% and a width of 8 mm was placed on the object's path in the object detecting position, this paper was moved on the path in a direction orthogonal to the direction of the object movement and the reflected light from the paper was detected by the photoreception element, thus carrying out an experiment.

Figure 6:
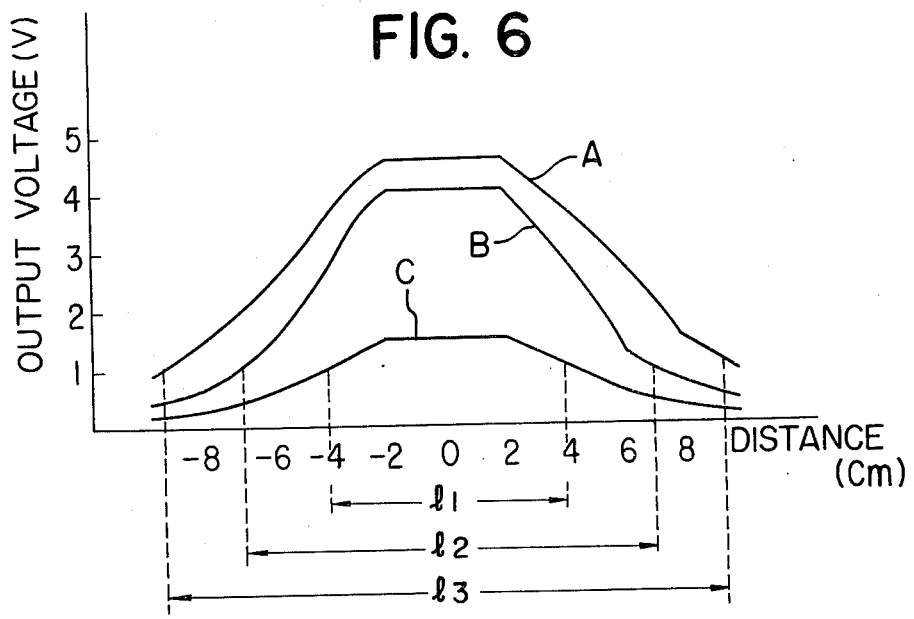
FIG. 6 is a graph illustrating the photoreception of the detecting device.

FIG. 6 is a graph illustrating the photoreception condition of the detecting device during the above-mentioned experiment, the ordinate representing the output voltage of the photoreception element and the abscissa representing the photoreception range of the photoreception element. In the abscissa, distance "O" corresponds to the state of the paper being placed at the center of its path (namely, the state of the paper being opposed to the center of the photoguide member), and other various distances correspond to the distances of the paper from the central position when laterally moved with the central position as the reference.

In the graph, curve A was obtained by the detecting device shown in FIG. 5 and curve B represents the case of the FIG. 2 detecting device in which the bulking agent 24 in the FIG. 5 detecting device was removed, and curve C (a comparative example) represents the case that the photoreception member 21 and the bulking agent 24 were removed.

Assuming that the photoreception element generates an object detection signal when the output voltage has become 1 V or higher, the element has a detection range of length $l_3$ for the curve A, and a detection range of length $l_2$ for the curve B, both these ranges being greater than the detection range $l_1$ for the curve C. It will thus be seen in the graph that the detecting device of the present invention has a wide detection range and high sensitivity, whereby it can reliably detect the object and prevent malfunctioning.

Figure 7:
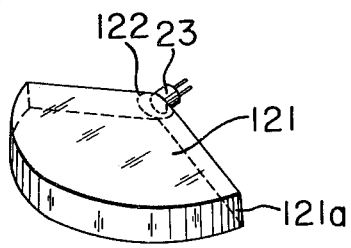
FIGS. 7 to 9 are perspective views showing further embodiments of the detecting device.

In FIG. 7, a photoguide member 121 is sector-shaped, and the first end face 121a thereof has a lateral width extending orthogonal to the direction of the object movement and is arcuately curved. The second end face 121b of the photoguide member has a recess 122 spherically formed in a portion thereof. A photoreception element 22 is disposed in opposed relationship with the recess 122, and the gap between the recess 122 and the photoreception surface of the element 23 is filled with a bulking agent.

Figure 8:
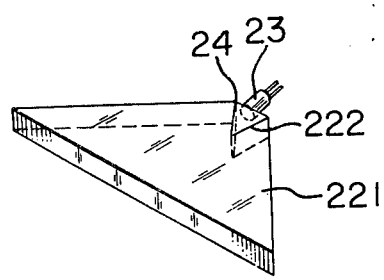

FIG. 8 shows a photoguide member 221 of triangular cross-section. The first end face 221a of the photoguide member 221 is formed in a plane extending parallel to the object's path and orthogonal to the direction of the object movement, and the second end face is formed with a triangularly cut-away recess 222. The gap between the recess 222 and the photoreception element 23 opposed to the recess 222 is filled with a bulking agent 24.

Figure 9:
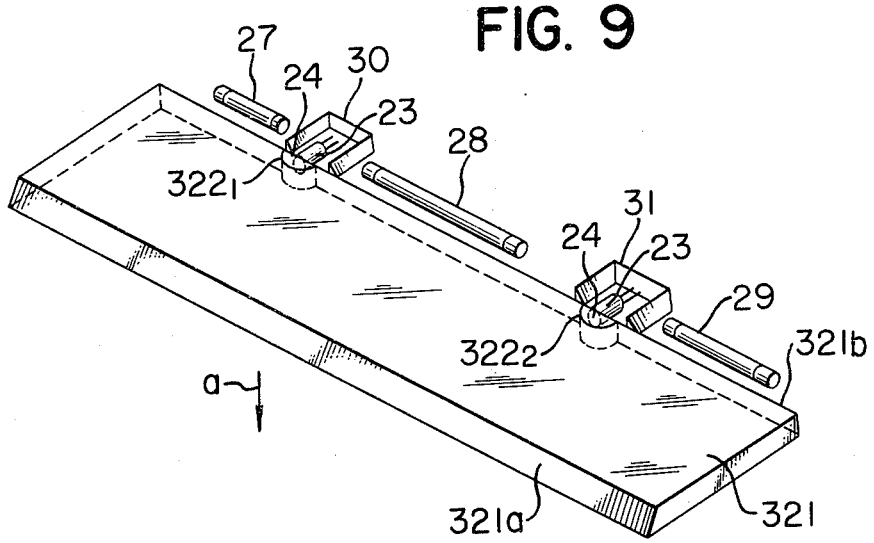

FIG. 9 shows a photoguide member 321 of rectangular cross-section. The first end face 321a thereof is formed in a plane inclined with respect to the object's path and extending in a direction orthogonal to the direction a of the object movement. The second end face 321b of the photoguide member is formed with two semicircularly cut-away recesses $322_1$ and $322_2$ suitably spaced apart from each other. The gaps between the respective recesses and photoreception elements 23, 23 opposed to the recesses are filled with a bulking agent 24.

Further disposed in opposed relationship with the second end face 321b are detecting light sources 27, 28 and 29 for illuminating the object. Designated by 30 and 31 are light-intercepting frames surrounding the photoreception elements 23 and 23.

The light beams from the sources 27, 28 and 29 are transmitted through the second end face 321b of the photoguide member 321 and passed through and reflected by the interior of the photoguide member 321 and exits from the first end face 321a, and the emergent light impinges on the object moving in front of the first end face 321a in the direction of arrow a and is reflected thereby. The light beams reflected by the object again enters the photoguide member through the first end face thereof and are transmitted through and reflected by the interior of the photoguide member 321, and further transmitted through the bulking agent 24 in the recess $322_1$ and $322_2$, and detected by the photoreception elements 24 and 24. According to this embodiment, a very wide range of detection can be achieved to enable detection of an object having a wide lateral width and moreover, the light sources and the photoreception elements can be disposed in side-by-side relationship to thereby simplify the assembly and fabrication of the device.

The inclination of the first end face 321a is formed at such an angle that the light beam having entered through the second end face 321b is not totally reflected by the first end face as far as possible.

Of the embodiments described above, those in which the first end face of the photoguide member is curved are relatively excellent in light-condensing property and sensitivity.

Figure 10:
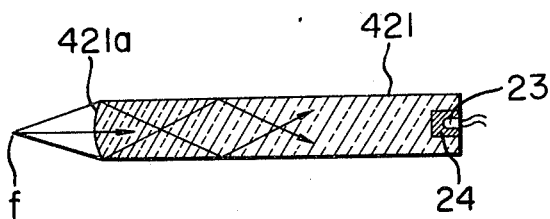
FIGS. 10 to 12 are cross-sectional views showing still further embodiments of the detecting device.

FIG. 10 shows an embodiment in which the first end face 421a of the photoguide member 421 is formed into a convex surface curved in the direction of the object movement and in which the object's path lies at the focal point of the convex surface.

Figure 11:
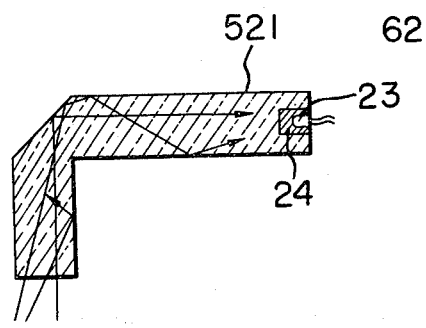

FIG. 11 shows an embodiment in which the light path is changed within a photoguide member 521.

Figure 12:
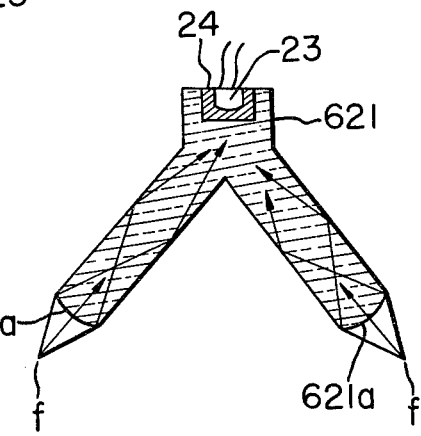

FIG. 12 shows an embodiment in which the first end face of a photoguide member 621 is divided in two convex surfaces 621a so that the light beams having entered through the two end faces 621a are condensed within the photoguide member 621 so as to impinge on the photoreception element 23. The optical distances from the two first end faces 621a to the photoreception element 23 are made equal, whereby it is possible to form an optical AND gate or an optical OR gate circuit corresponding to an electrical AND gate or an electrical OR gate circuit which may simultaneously or selectively detect two moving objects.

Obviously, the object to be photographed is not restricted to sheet-like ones but various bodies may be used.

As the detecting light sources, use may be made of any of planar light sources, spot light sources or linear light sources.

The detection system is not restricted to the reflection type but the detection may be accomplished as by the so-called transmission type in which a light source and a photoguide member are oppposedly disposed with the object's path interposed therebetween.

According to the present invention, as hitherto described, a wide range of detection can be obtained with higher sensitivity and accordingly, the object to be photographed can be reliably and quickly detected, thus preventing erroneous detection. For example, even if a sheet of paper as the object to be photographed is being moved obliquely, such movement of the paper may be detected reliably and in a short time. Also, the alignment between the light source and the axis of the photoreception element can be achieved very simply and the assembly and fabrication of the device is very easy to do.

Further, the bulking agent filling the gap between the photoreception element and the photoguide member reduces the loss of light and furthermore, the photoreception surface of the elements may remain coarse without the necessity of being smoothed.

What we claim is:

1. A device for detecting a moving body, comprising:
   means for illuminating a moving body at a predetermined position along the path of movement of the body;
   a photoguide member for receiving light reflected by the body, said photoguide member comprising a substantially transparent solid disc segment provided with a light receiving surface which defines a portion of a cylinder having its axis disposed along the axis of the disc segment and in parallel with the direction movement of the body, said transparent disc segment having parallel end surfaces, and having a concave surface disposed radially inward from said light receiving surface, wherein light directed from said light receiving surface is emitted from said concave surface, and wherein said light receiving surface is disposed adjacent said predetermined position along the path of movement of said body; and
   a light receiving element located in opposition to said concave surface for receiving the light emitted from said photoguide member, said light receiving element including a photoelectric converter.

2. A device according to claim 1, wherein the gap between said recess and said photodetector means is filled with a light transmitting material.

3. A device according to claim 2, wherein said filling material has light diffusing property.

4. A device according to claim 2, wherein said filling material has a refractive index approximate to that of said photoguide member.

5. A device according to claim 2, wherein said filling material is synthetic resin.

6. A device according to claim 2, wherein said filling material is one which selectively transmits a specific wavelength range of light.

7. A device according to claim 1, wherein a photoreception surface of said light receiving element is located in a recess defined by said concave surface of said photoguide member.

8. A device according to claim 1, wherein said concave light emitting surface is formed by scraping out a portion of said transparent solid disc segment.

9. A device according to claim 1, wherein said concave light emitting surface is formed by cutting away a portion of said transparent solid disc segment.

10. A device according to claim 1, wherein said concave light emitting surface defines an arcuately curved shape.

11. A device according to claim 1, wherein said concave light emitting surface comprises a diffusing surface.

12. A recording device wherein an image of an object is photographed on a photosensitive member, comprising:
   means for moving an object to be photographed along a path through a photographing station;
   means for illuminating the object at a predetermined position while it is being moved along the path;
   a photosensitive member;
   optical means for projecting an image of the object from said photographing station onto the photosensitive member;
   a photoguide member for receiving light reflected by the object, said photoguide member comprising a substantially transparent solid disc segment provided with a light recieving surface which defines a portion of a cylinder having its axis disposed along the axis of the disc segment and in parallel with the direction of movement of the object, said transparent disc segment having parallel end surfaces, and having a concave surface disposed radially inward from said light receiving surface, wherein light directed from said light receiving surface is emitted from said concave surface, and wherein said light receiving surface is disposed adjacent said predetermined position along the path of movement of said object;
   a light receiving element located in opposition to said concave surface for receiving the light emitted from said photoguide member, said light receiving element including a photoelectric converter; and
   means for controlling recording operations in response to an output signal from said light receiving element.

* * * * *